(12) United States Patent
Hida et al.

(10) Patent No.: US 10,744,583 B2
(45) Date of Patent: Aug. 18, 2020

(54) WELDING CONDITION GENERATING METHOD IN FLAT POSITION WELDING

(71) Applicant: Kobe Steel, Ltd., Hyogo (JP)

(72) Inventors: Masatoshi Hida, Kobe (JP); Koji Kawakami, Fujisawa (JP)

(73) Assignee: Kobe Steel, Ltd., Hyogo (JP)

( * ) Notice: Subject to any disclaimer, the term of this patent is extended or adjusted under 35 U.S.C. 154(b) by 646 days.

(21) Appl. No.: 15/609,158

(22) Filed: May 31, 2017

(65) Prior Publication Data

US 2018/0001411 A1    Jan. 4, 2018

(30) Foreign Application Priority Data

Jul. 4, 2016  (JP) .................. 2016-132302

(51) Int. Cl.
  *B23K 9/02*  (2006.01)
  *B23K 9/16*  (2006.01)
  *B23K 9/095*  (2006.01)
  *G05B 19/19*  (2006.01)

(52) U.S. Cl.
  CPC .......... *B23K 9/0216* (2013.01); *B23K 9/0953* (2013.01); *B23K 9/16* (2013.01); *G05B 19/19* (2013.01); *G05B 2219/45104* (2013.01)

(58) Field of Classification Search
  CPC ...... B23K 9/0216; B23K 9/0953; B23K 9/16; B23K 9/025; B23K 26/244; B23K 9/02; B23K 9/08; B23K 9/095–0953; B23K 9/12; B23K 9/124–125; B23K 9/0956; G05B 19/19; G05B 2219/45104; G05B 2219/36417; G05B 19/4083;
(Continued)

(56) References Cited

U.S. PATENT DOCUMENTS 6,155,475 A * 12/2000 Ekelof ................. B23K 9/1274
                                                      219/124.22
10,144,081 B2 * 12/2018 Aoki .................... B23K 9/0953
(Continued)

FOREIGN PATENT DOCUMENTS

CN       104679806 A    6/2015
JP       S56-168966 A   12/1981
(Continued)

*Primary Examiner* — Dana Ross
*Assistant Examiner* — Ket D Dang
(74) *Attorney, Agent, or Firm* — Studebaker & Brackett PC

(57) ABSTRACT

A welding condition generating method in flat position welding is a method for determining welding conditions for welding in a single V groove, a single bevel groove, or a fillet groove in a flat position using a welding robot. The method includes preparing conditions A and B, each including a plurality of different parameters used in calculation for determining the welding conditions; and generating the welding conditions by combining parameters included in the conditions A and B. The condition A includes at least one of the following parameters: a joint shape, a groove shape, a groove angle, a gap width, and the presence or absence of backing. The condition B includes at least one of the following parameters: a welding gas type, a welding wire diameter, a welding wire type, a welding wire extension length, a welding source type, a power source characteristic, and a torch type.

10 Claims, 3 Drawing Sheets

(58) Field of Classification Search
CPC ........... G05B 2219/45135; G05B 2219/45138; Y10S 901/42
USPC ........... 219/61, 125.1, 130.5, 124.22; 901/42
See application file for complete search history.

(56) References Cited

U.S. PATENT DOCUMENTS

2014/0008415 A1* 1/2014 Shen .................... B23K 9/0216
228/10
2016/0107255 A1    4/2016 Aoki et al.
2017/0209950 A1    7/2017 Nishimura et al.

FOREIGN PATENT DOCUMENTS

| JP | S62-259673 A | 11/1987 |
|----|--------------|---------|
| JP | S63-252671 A | 10/1988 |
| JP | 06-126453 A  | 5/1994  |
| JP | H08-150474 A | 6/1996  |
| JP | H09-10939 A  | 1/1997  |
| JP | 2015-104743 A| 6/2015  |
| JP | 2015-229169 A| 12/2015 |

* cited by examiner

RELATIONSHIP OF END STOP TIME TO WEAVING WIDTH AND COUNT (ACTUAL DATA AND MODEL)

WELDING CONDITION GENERATING METHOD IN FLAT POSITION WELDING

BACKGROUND OF THE INVENTION

1. Field of the Invention

The present invention relates to a welding condition generating method in flat position welding.

2. Description of the Related Art

A welding robot automatically performs welding on a workpiece. A welding tool including a welding torch is attached to a tip portion of the welding robot (e.g., articulated robot). Typically, a teach pendant (operating device) for operating such a welding robot is connected to a controller that controls the motion of the welding robot.

The teach pendant is a portable operating device, and is used to teach the welding robot the travel path and position of the welding tool with respect to the workpiece by actually operating the welding robot mainly through manual operation. Welding conditions are also taught through the teach pendant.

Examples of a wide variety of welding conditions taught through the teach pendant include a base metal shape, a joint shape, a welding position, and a welding target position (torch target position). Optimizing these welding conditions is essential to achieve best welding operations. Particularly in flat position welding, it is very important to generate and then set appropriate welding conditions. However, while it may be possible for skilled operators to generate and determine optimum welding conditions, it is often difficult for less experienced operators to do so.

For example, Japanese Unexamined Patent Application Publication No. 6-126453 discloses a technique in which, in the selection of welding conditions for arc welding, welding conditions are selected from an operation unit in accordance with instructions from the operator, and then necessary information is set, which includes a workpiece to be subjected to welding, a groove shape, a welding position, a welding method, and a welding material.

Before welding, a wide variety of welding conditions need to be determined and set. As described above, it is often difficult for less experienced operators to generate and determine optimum welding conditions.

The technique disclosed in Japanese Unexamined Patent Application Publication No. 6-126453 is not one that solves this problem. Even when this technique is used, questions remain as to whether it is possible to appropriately generate and determine welding conditions for flat position welding.

Accordingly, an object of the present invention is to provide a welding condition generating method for appropriately setting welding conditions for flat position welding.

SUMMARY OF THE INVENTION

To achieve the object described above, the present invention takes the technical measures described below.

That is, a welding condition generating method in flat position welding according to an aspect of the present invention is a method for determining welding conditions for welding in a single V groove, a single bevel groove, or a fillet groove in a flat position using a welding robot. The welding condition generating method includes preparing a condition A and a condition B, each including a plurality of different parameters used in calculation for determining the welding conditions; and generating the welding conditions by combining at least one of the parameters included in the condition A with at least one of the parameters included in the condition B. The condition A includes a type of joint and groove shape, and geometrical parameters of a workpiece to be subjected to welding and a groove corresponding to the type. The condition B includes parameters related to welding specifications.

The condition A preferably includes at least one of the following parameters: a joint shape, a groove shape, a groove angle, a gap width, and the presence or absence of backing.

The condition B preferably includes at least one of the following parameters: a welding gas type, a welding wire diameter, a welding wire type, a welding wire extension length, a welding source type, a power source characteristic, and a torch type.

For the first layer of welding, a welding current and a welding voltage may be determined as the welding conditions. For the second and subsequent layers of welding, a current value obtained by changing the welding current for the first layer by a predetermined amount, or within a predetermined range of amounts, may be determined as a common current. A welding speed may be determined such that the following two conditions are satisfied;

$$V(\text{maximum speed}) \geq V2 > \ldots > Vn \geq V(\text{minimum speed}), \text{ and}$$

$$V(i)-V(i+1) \geq V(i+1)-V(i+2) \ (i=i0, \ldots : i0 \text{ is } 1 \text{ or } 2)$$

Each time a weld layer is deposited in welding, a remaining weld cross-sectional area may be calculated using a trapezoid approximating the remaining weld cross-sectional area. Then, each time a base length of the trapezoid exceeds a predetermined value, the number of passes for the layer may be increased.

When the number of passes for the layer is increased, a welding speed for the layer may be returned to a welding speed for the second layer.

When a layer is divided into passes, a welding current and a welding speed for the layer may be left unchanged after the division.

As a welding target position for the first layer, a target height y with respect to an origin height x at a base of the trapezoid may be determined by a linear expression y=x+b0. As a welding target position for the second and subsequent layers, a target height y with respect to an existing weld height x may be determined by a linear expression y=x+b1.

The condition B may include a weaving width as a parameter, and the weaving width may be obtained by adding or subtracting a predetermined offset to or from the base length of the trapezoid.

The weaving width may be determined by the following equation:

weaving width=(base length+offset+lap length×(number of passes−1))/number of passes.

The parameters included in the condition A and the condition B may be determined or updated by learning from past welding records.

The present invention makes it possible for even less experienced operators to generate optimum welding conditions for flat position welding.

DESCRIPTION OF THE PREFERRED EMBODIMENTS

A welding robot system 1 (hereinafter simply referred to as "robot system 1") according to embodiments of the present invention will now be described with reference to the drawings.

First, a general configuration of the robot system 1 according to the present embodiment will be described with reference to FIG. 1.

Figure 1:
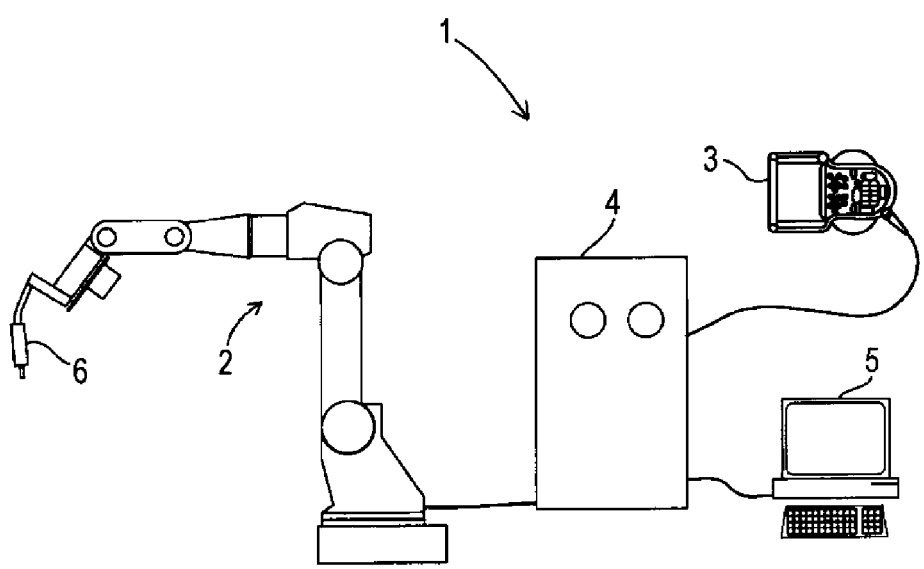
FIG. 1 is a schematic diagram illustrating a configuration of a welding robot system.

As illustrated in FIG. 1, the robot system 1 includes a welding robot 2, a controller 4 equipped with a teach pendant 3, and a personal computer 5.

The welding robot 2 is, for example, a six-axis vertical articulated industrial robot. A welding tool 6 including a welding torch is attached to a flange portion at the tip of the welding robot 2. The welding robot 2 may be mounted on a slider (not shown) capable of carrying and moving the welding robot 2.

The controller 4 outputs a motion instruction to the welding robot 2 on the basis of operation instruction information output from the teach pendant 3 and indicating the direction of motion of the welding robot 2, and also outputs a motion instruction to the welding robot 2 in accordance with a pre-taught program (teaching program), thereby controlling the motion of the welding robot 2. Note that the operation instruction information is set by operating operation buttons on the teach pendant 3.

The teaching program may be created using the teach pendant 3 connected to the controller 4, or may be created using an offline teaching system on the personal computer 5. In either case, the teaching program is created before an actual welding operation of the welding robot 2, so as to indicate the motion of the welding robot 2 during the welding operation. The teaching program created offline on the personal computer 5 may be passed on to the controller 4 via a medium having data magnetically or electrically stored therein, or may be transferred to the controller 4 by data communication.

The personal computer 5 (or offline teaching system) includes a display capable of presenting graphics as a display device, and also includes a keyboard and a mouse as an input device. The personal computer 5 is provided with a reading or communication device for acquiring computer-aided design (CAD) information of a workpiece.

As described above, in the robot system 1 according to the present embodiment, a teaching program is created using the teach pendant 3 or the personal computer 5. This creation of the teaching program is called a teaching operation. When performing the teaching operation or whenever operating the welding robot 2, the operator holding the teach pendant 3 stands outside the operating range of the welding tool 6.

A wide variety of welding conditions are set using the teach pendant 3. For example, a base metal shape, a joint shape, a weld joint position (base metal angle), and a welding target position (torch target position) are input using input keys on the teach pendant 3.

The present invention deals with an appropriate method for generating welding conditions that are set using the teach pendant 3, and particularly a method for generating each of welding conditions for flat position welding.
(Method for Generating Welding Conditions)

First, welding conditions are broadly divided into a condition A and a condition B. The condition A includes a type of joint and groove shape, and geometrical parameters of a workpiece to be subjected to welding and a groove corresponding to the type. Specifically, the condition A includes one of the three types (1) flat position fillet, (2) flat position single-V groove, and (3) flat position single-bevel; a groove angle; a gap width; and the presence or absence of backing. The condition B includes parameters related to welding specifications. Specifically, the welding specifications include a gas type, a wire diameter, a wire type (brand or standard), a wire extension length, a welding source (model number), a power source characteristic (pulse or constant voltage), and a torch type (single or tandem). Each of the welding specifications has a parameter for generating welding conditions.

The welding conditions (various parameters) for flat position welding are determined by combining specifications (i.e., one of the types (1) to (3), a groove angle, a gap width, and the presence or absence of backing) included in the condition A with welding specifications included in the condition B.

For the gap width, the presence or absence of hot cracks is taken into account and, for example, two conditions, 0 mm and 5 mm, are retained so that the condition can be switched at 3 mm. In the following description of the embodiments, a backing metal is present regardless of the size of the gap width.

For welding specifications, the following standard conditions, which are often used, are described as conditions actually generated in the present embodiment: "gas type: Ar—$CO_2$, wire diameter: 1.2 mm, wire type (brand or standard): MG50-R, wire extension length: 22 mm, welding source (model number): AB500, power source characteristic: constant voltage, torch: single".

If there is no corresponding welding specification in the standard conditions, for example, the brand of the wire type may be replaced with the wire standard, and the power source characteristic, instead of the welding source, may be selected because the power source characteristic can be regarded as a condition of a similar kind. The other conditions (gas type, wire diameter, wire extension length, and torch) need to match the standard conditions.

Once the parameters of the condition B are determined, a relationship between a wire feed speed and a target welding current is determined, and the wire feed speed and an appropriate welding voltage value can also be determined. Those values are determined using a table or equation. Therefore, once a welding current and a welding speed are determined under the parameters of the condition B, the amount of weld deposition per unit time and the weld cross-sectional area can be calculated.

That is, the condition B is necessary and sufficient for determining so-called melting parameters. Note that the parameters included in the condition B in the present embodiment are an example in arc welding. The parameters of the condition B may be changed depending on the welding method.

In the present embodiment, the following items are automatically calculated as welding conditions:
(1) the number of layers and the number of passes,
(2) a welding current and a welding speed for each layer and pass,
(3) a target position for each layer and pass, and
(4) weaving conditions for each layer and pass (weaving width, weaving count, and end stop time).

The items listed above are determined from the condition A and the condition B. For example, the welding current and the welding speed are adjusted in accordance with the geometrical shape in the condition A.

In the present embodiment, the calculation is performed with the following resolutions:
welding current: 10 A,
welding speed: 1 cm/minute,
target position, weaving width: 1 mm,
weaving count: 5 times/minute, and
weaving end stop time: 0.1 seconds.

In the automatic calculation of the present embodiment, the welding conditions are generated by combining parameters obtained from the condition A with parameters obtained from the condition B, and also by switching the combination.

Selection of geometrical parameters for each type of joint and groove shape will now be described.

Figure 2:
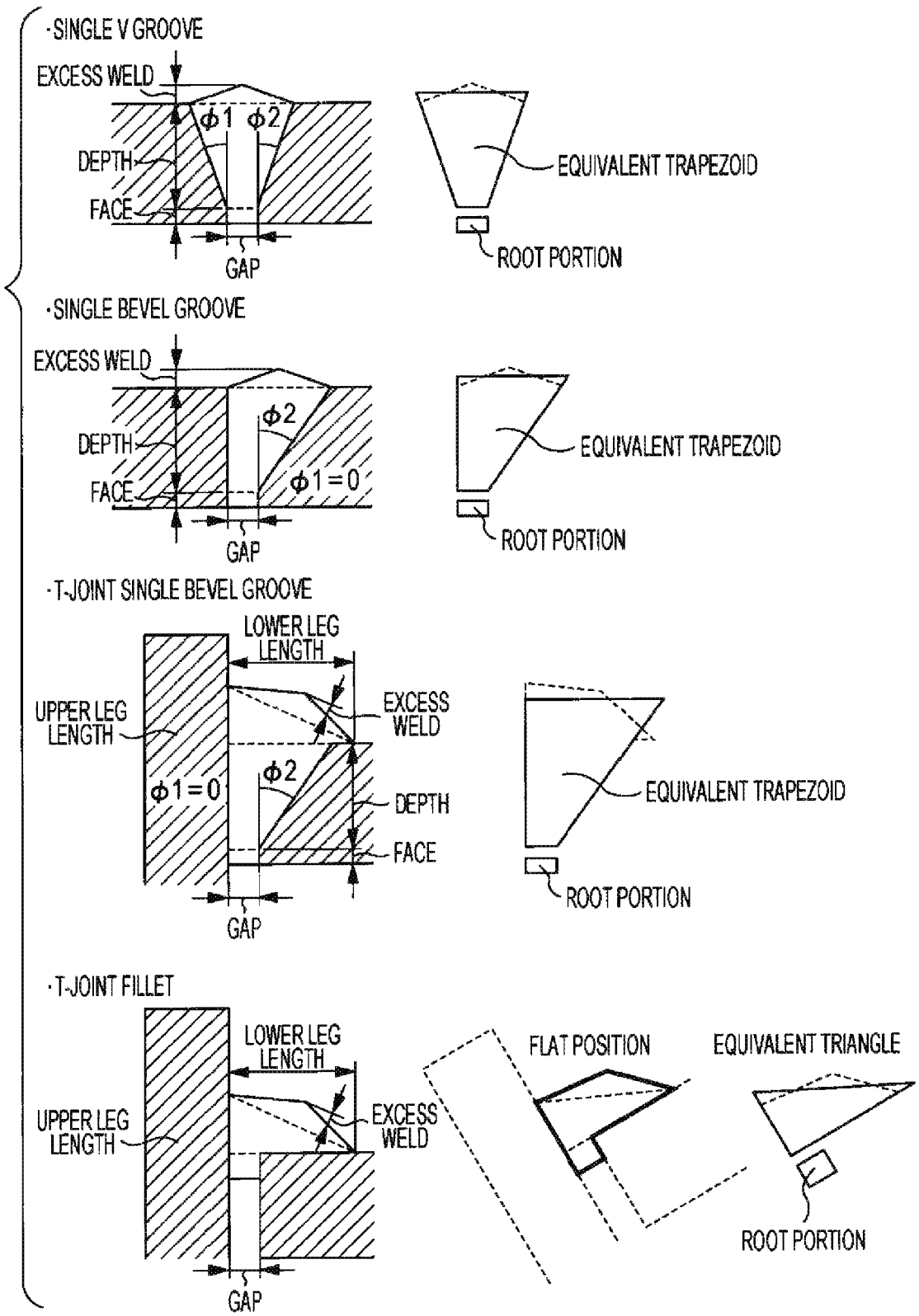
FIG. 2 illustrates weld cross-sections of various shapes.

Depending on the type of joint and groove shape "(1) flat position fillet, (2) flat position single-V groove, or (3) flat position single-bevel", there are parameters for determining the geometrical shapes of a workpiece and a weld. Examples of the parameters include a plate thickness, a groove angle (right angle, left angle), a groove depth, a root face, a leg length, and a gap, which are defined as illustrated in FIG. 2.

After the geometrical parameters for the joint and groove shape are determined, welding models are constructed (modeled). The concept of this modeling will be described.

The number of layers and the number of passes in welding will be described. First, the total amount of weld deposition, including excess weld, is calculated. Next, the area of a root portion corresponding to a root gap, and the area of an equivalent trapezoid having a gap width as a base length and having an angle equal to a groove angle, are calculated. Then, the upper side length and the height of the equivalent trapezoid are calculated. That is, the area of the equivalent trapezoid is calculated on the basis of the following equations:

(area of root portion)=(gap width)×{(plate thickness)−(depth)}, and (area of equivalent trapezoid)=(weld cross-sectional area determined by total amount of weld deposition including excess weld)−(area of root portion).

Then, from the area of the equivalent trapezoid, the gap width, and the groove angle, the upper side length and the height of the equivalent trapezoid are calculated.

For a T-joint fillet, the area of a root portion corresponding to a root gap, and the height and the upper side length of an equivalent trapezoid having a base length of 0 (which is a gap width of 0), that is, the height and the base length of a triangle illustrated in FIG. 2, are calculated. In the present embodiment, this shape is treated as an equivalent trapezoid with a base length of 0.

Then, a cross-sectional area of a weld to be deposited to the portion of the equivalent trapezoid is calculated by subtracting the cross-sectional area of a weld deposited with a welding current and speed for the first layer (described below) from the area of the root portion. The shape of the remaining trapezoid to be welded is obtained by cutting the base portion of the equivalent trapezoid corresponding to the amount of cross-sectional area of a weld to be deposited to the portion of the equivalent trapezoid.

From the calculated height of the equivalent trapezoid and the minimum weld height and the maximum weld height for each layer, a possible range of the number of layers is tentatively calculated and the range of the number of layers to be searched is acquired in advance.

Then, a combination of a welding current and a welding speed is determined by the method described below, the amount of weld deposition is calculated from a wire feed speed determined from the welding current, and the shape of the remaining equivalent trapezoid is calculated each time by subtracting the weld cross-sectional area from the shape of the equivalent trapezoid.

A rule applied here is to perform division into passes (or pass division) when the base length of the remaining equivalent trapezoid (i.e., equivalent trapezoid to be filled) exceeds a predetermined value. Specifically, under the standard conditions, when the base length of the equivalent trapezoid exceeds 25 mm, the number of passes is increased to two, and when the base length of the equivalent trapezoid exceeds 38 mm, the number of passes is increased to three. Likewise, the number of passes is increased each time the base length of the equivalent trapezoid increases by 13 mm.

The optimum welding conditions (i.e., the number of layers and the number of passes) can thus be determined.

The concept of a welding current and a welding speed will now be described.

First, for the first layer (first pass), welding conditions that do not cause hot cracks are determined by combining the condition A including "joint and groove shape+groove angle+gap width+presence or absence of backing" with the condition B. The welding conditions that do not cause hot cracks are retained as parameters. A current I1 and a welding speed V1 for the first layer are determined by these parameters.

For the gap width, two different conditions, 0 mm and 5 mm, are retained so that the condition can be switched at 3 mm. Then, the condition to be used is changed in accordance with the actual target gap. Note that depending on the groove angle or shape, ranges may be specified for the current value and the welding speed, and all combinations within the specified ranges can be searched. Examples of combinations selected by the search are as follows: (V1, I1)=(28,300), (29,300), (30,300).

For the second and subsequent layers, a current that is greater than the current I1 for the first layer is determined as a common current Ic. The common current Ic is expressed as Ic=I1+ΔI, where ΔI is a parameter whose range is specified. Specifically, ΔI ranges from 10 A to 30 A. The welding speed slows down within a given range as the process proceeds from one layer to another, such that Vi=Vi−1−ΔV (e.g., ΔV=2 cm/minute to 5 cm/minute) is satisfied. That is, the following relationship is satisfied:

V(maximum speed)≥V2> . . . >Vn≥V(minimum speed).

For the welding speed for the second and subsequent layers, there is a limitation that prevents the speed difference from widening as follows.

V(i)−V(i+1)≥V(i+1)−V(i+2) (i=i0, . . . )

i0=1: first and second layers follow this rule i0=2: second and subsequent layers follow this rule When a pass is added after execution of the pass division described above, a welding speed that satisfies the condition of V2 above is selected. In this case, the current and the welding speed for the layer to which a pass is added are left unchanged.

If the search determines that the amount of weld deposition is sufficient, the common current Ic may be reduced by about 10 A to 20 A so that the amount of weld deposition for the last layer is within a predetermined range.

The optimum welding conditions (current and welding speed) can thus be determined.

As described above, in accordance with "the concept of the number of layers and the number of passes" and "the method for determining current and welding speed", a possible combination of current and welding speed is applied to each layer and pass. Then, if the total amount of weld deposition is within an appropriate range with respect to the maximum amount of weld deposition, the applied combination is stored as candidate conditions. After searching all combinations, priorities are assigned to a plurality of candidate conditions on the basis of the total number of passes and cycle time, and the best candidate is selected and determined.

Next, the concept of a target position, a weaving width, a weaving count, and end stop time in welding will be described.

For a cumulative weld height, a vertical target position is modeled and determined by the following linear equations:

first layer: $y=x+b0$ second and subsequent layers: $y=x+b1$ where x is the cumulative weld height and y is the vertical target position.

In this technique, a position slightly above the origin with a height of 0 is targeted for the first layer because of interference by the torch. For the second and subsequent layers, a straight line with a slope of 1 is used for adding the same offset to the calculated weld height.

Then, b0 and b1 are determined by learning through regression calculation in accordance with the groove shape. Since there is one variable, the following equations are used to determine b0 and b1:

equation for deriving $b0$: $b0=(\Sigma Yi-\Sigma Xi)/n$ equation for deriving $b1$: $b1=(\Sigma Yi-\Sigma Xi)/n$ (when there are $n$ pieces of data).

A horizontal target position is the center of the weaving width.

The concept of the weaving width and the horizontal target position in welding will now be described.

Models for determining the conditions of the weaving width and the horizontal target position are as follows.

Figure 3:
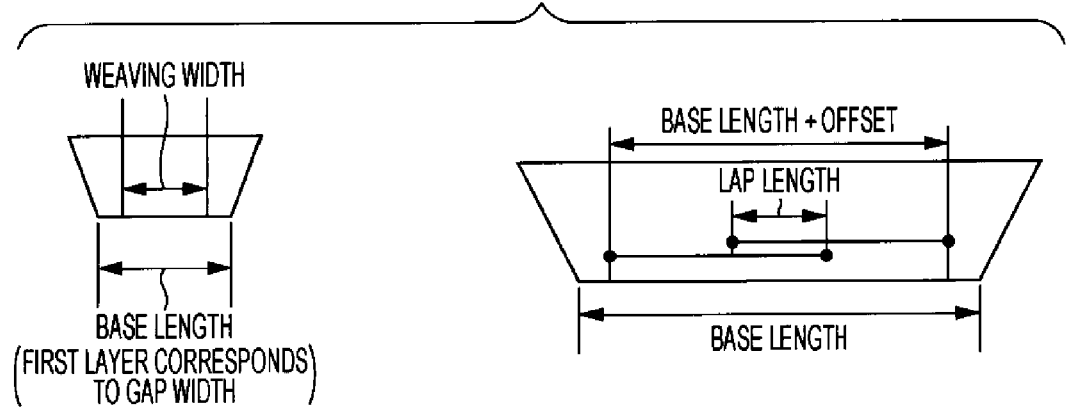
FIG. 3 illustrates a model of welding in one pass for each layer, and a model of welding in two passes for each layer.

A model of welding in one pass for each layer, and a model of welding in two passes for each layer, are as illustrated in FIG. 3. A value designated for each condition A is used for the first layer, and "weaving width=base length (of equivalent trapezoid)+offset" is used for the second layer. For the third and subsequent layers, the following equation is used to make the offset common among the layers:

weaving width=(base length+offset+lap length× (number of passes−1))/number of passes.

The weaving width is modeled and determined by this equation. Note that the offset and the lap length are optimum values statistically determined from existing data.

The concept of the weaving count and the end stop time in welding will now be described.

Basically, conditions for the first layer are predetermined fixed conditions (e.g., weaving count: 120, end stop time: 0 seconds). If the wavelength obtained by dividing the welding speed by the weaving count exceeds a predetermined threshold (e.g., 0.33), an adjustment is made by increasing the weaving count in increments of +20 such that the wavelength does not exceed the predetermined threshold.

Conditions for the second layer (except in the case where it is the last layer) are also predetermined fixed conditions (e.g., weaving count: 60, end stop time: 0.2 seconds). For the third and subsequent layers, the weaving count is adjusted within a given range (e.g., 40 to 80) such that the wavelength falls within a predetermined range (e.g., 0.325 to 0.533).

Figure 4:
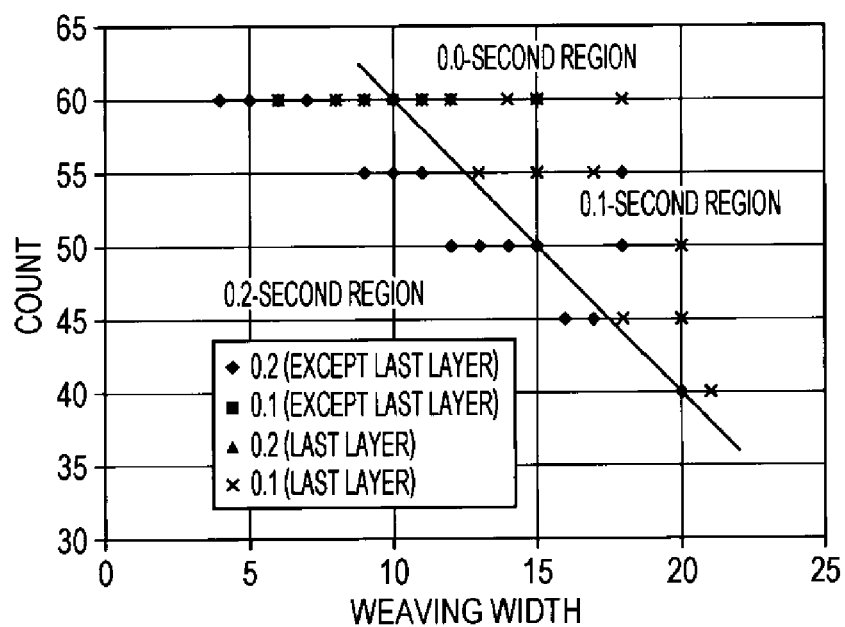
FIG. 4 is a graph showing the relationship of end stop time to weaving width and count (actual data and model).

For setting the end stop time, the boundaries between a 0.2-second region, a 0.1-second region, and a 0.0-second region are defined, as illustrated in FIG. 4, on the basis of the weaving width and the weaving count. The end stop time is set in accordance with the boundaries. In the example of FIG. 4, the boundary between the 0.2-second region and the 0.1-second region is represented by a straight line that passes through (weaving width, weaving count)=(20, 40)–(10, 60).

When the weaving count exceeds 60, the end stop time is 0 seconds regardless of the weaving width. The boundaries described above are determined using a learning technique, such as a support vector machine.

On the basis of the concept of modeling described above, a calculation for determining welding conditions is performed in accordance with the following procedure.

(1) The shapes of joint and groove to be processed and dimensional values are input. That is, calculation parameters to be used are acquired.

(2) The appropriate maximum amount of excess weld is calculated in accordance with the shapes of joint and groove to be processed. The upper side length and the height of an equivalent trapezoid are calculated, which is equal in area, base length, and angle to the cross-sectional area (weld cross-sectional area), base length, and groove angle, respectively, of the entire weld.

(3) All candidates for a current and a speed for the start pass are extracted, for example, in the following manner: (V1, I1)=(28,300), (29,300), (30,300).

(4) Conditions for the first layer are selected from candidate conditions for the first layer (V1, I1).

(5) The amount of weld deposition and the weld shape corresponding to the first pass of welding performed under the conditions for the first layer are calculated. Then, an equivalent trapezoid having an area equal to the remaining weld cross-sectional area is calculated. From the minimum weld height and the maximum weld height, the minimum and maximum numbers of layers to be deposited are calculated.

(6) Candidates for the common current Ic are generated from I1 (e.g., Ic=I1+10 to I1+30).

(7) One common current Ic is selected from the candidate currents, and the minimum welding speed Vlow is calculated from the maximum amount of weld deposition and Ic.

(8) One candidate welding speed is selected, the amount of weld deposition and the weld shape are calculated, and an equivalent trapezoid having an area equal to the remaining weld cross-sectional area is calculated.

(9) If the amount of weld deposition is within a target range with respect to the total amount of weld deposition, the calculation ends, and the search calculation is continued under the subsequent candidate conditions (welding speed, common current, and conditions for the first layer).

(9)' If the amount of weld deposition is still outside the target range even after the maximum number of layers to be searched is reached, the calculation ends and the search calculation is continued under the subsequent candidate conditions.

(10) After the searching, a candidate having the highest score in the evaluation function generated from the point of view of a recommended value, the number of passes, and the speed of operation is presented as a result.

(11) The target position, weaving width, weaving count, and end stop time in welding are calculated as necessary.

With the welding condition generating method in flat position welding described above, it is possible even for less experienced operators to generate optimum welding conditions for flat position welding.

A description will now be given of how the welding condition generating method in flat position welding is determined through learning.

In the learning of parameters used for welding, attention needs to be paid to the following points.

If an adjustment for the last layer of welding is not made in accordance with rules, then this example cannot be used as learning data. Learned parameters may thus need to be corrected such that they are set within an appropriate range. If learning data is generated substantially in accordance with rules, then it is not necessary to pay much attention to such a case. If, for example, the range of speed differences increases, the search space unnecessarily increases and it takes longer time in calculation. Accordingly, rather than automatically setting the maximum and minimum values, it is necessary to set optimum values while checking a histogram or the like and removing exceptions.

Specifically, it is necessary to determine and generate welding conditions by learning parameter while paying attention to the following points.

The weaving width in parameter learning is as follows.

(1) For the first layer, the weaving width is a designated value. If there is a gap, the weaving width substantially ranges from a value equal to the gap width to a value 1 mm less than the gap width. If there is no gap, the weaving width ranges from 2 mm (groove angle: 45° or less) to 4 mm (groove angle: 90°).

(2) For the second layer, the weaving width is "base length+offset".

(3) For the third and subsequent layers, the following equation is used to make the offset common among the layers:

weaving width=(base length+offset+lap length× (number of passes−1))/number of passes.

For the second and third layers, parameters are determined from existing data by simple regression calculation in accordance with the above-described model equation for determining the weaving width.

A vertical shift position in parameter learning is an integer value obtained by rounding the following calculated value:

first layer: $y=a0 \cdot x+b0$ third and subsequent layers: $y=a1 \cdot x+b1$ where x is a weld height. It is appropriate that a0 and a1 be fixed values (a0=0, a1=1), but they need to be changeable to provide extensibility. Note that b0 and b1 are determined by regression calculation (least squares method). Since there is one variable, the following equations are used to determine b0 and b1:

equation for deriving $b0$: $b0=(\Sigma Yi-\Sigma Xi)/n$ equation for deriving $b1$: $b1=(\Sigma Yi-\Sigma Xi)/n$ (when there are $n$ pieces of data).

Again, parameters can be easily determined from existing data by regression calculation.

In parameter learning, the weaving count and the end stop time for the first and second layers are fixed parameters. If the wavelength obtained by dividing the welding speed by the weaving count exceeds a predetermined threshold (e.g., 0.33), the weaving count is adjusted such that the wavelength does not exceed the predetermined threshold. The adjustment is made such that the wavelength gradually decreases (i.e., wavelength for second layer≥wavelength for third layer≥ . . . ≥) without fluctuations.

For the end stop time for the third and subsequent layers, the boundaries of a 0.1-second region, a 0.2-second region, and a 0.0-second region are determined using a learning technique, such as a support vector machine, on the basis of the relationship between the weaving width and the weaving count. In the example of FIG. 4, the boundaries for changing the end stop time are represented by the straight line that passes through (weaving width, weaving count)=(20, 40)– (10, 60) and the boundary that corresponds to a weaving count of 60.

Under the conditions described above, the parameters included in the condition A and the condition B are determined or updated by learning from past welding records, so that optimum welding conditions are determined. It is thus possible to generate and determine more appropriate welding conditions.

What is claimed is:

1. A welding condition generating method for determining welding conditions for welding in a single V groove, a single bevel groove, or a fillet groove in a flat position using a welding robot, the welding condition generating method comprising:
preparing a condition A and a condition B, each including a plurality of different parameters used in calculation for determining the welding conditions; and
generating the welding conditions by combining at least one of the parameters included in the condition A with at least one of the parameters included in the condition B,
wherein the condition A includes at least one of a type of joint and groove shape, and geometrical parameters of a workpiece to be subjected to welding and a groove corresponding to the type;
the condition B includes parameters related to welding specifications;
for the first layer of welding, a welding current and a welding voltage are determined as the welding conditions;
for the second and subsequent layers of welding, a current value obtained by changing the welding current for the first layer by a predetermined amount, or within a predetermined range of amounts, is determined as a common current; and
a welding speed is determined such that the following two conditions are satisfied:

$V(\text{maximum speed}) \geq V2 > \ldots > Vn \geq V(\text{minimum speed})$, and $V(i)-V(i+1) \geq V(i+1)-V(i+2) (i=i0, \ldots : i0 \text{ is } 1 \text{ or } 2)$,
where $n$ and $i$ are layer numbers.

2. The welding condition generating method according to claim 1, wherein the condition A includes at least one of the following parameters: a joint shape, a groove shape, a groove angle, a gap width, and the presence or absence of backing.

3. The welding condition generating method according to claim 1, wherein the condition B includes at least one of the following parameters: a welding gas type, a welding wire diameter, a welding wire type, a welding wire extension length, a welding source type, a power source characteristic, and a torch type.

4. The welding condition generating method according to claim 1, wherein each time a weld layer is deposited in welding, a remaining weld cross-sectional area is calculated using a trapezoid to approximate the remaining weld cross-sectional area, and each time a base length of the trapezoid exceeds a predetermined value, the number of passes for the layer is increased.

5. The welding condition generating method according to claim 4, wherein when the number of passes for the layer is increased, a welding speed for the layer is returned to a welding speed for the second layer.

6. The welding condition generating method according to claim 4, wherein when a layer is divided into passes, a welding current and a welding speed for the layer are left unchanged after the division.

7. The welding condition generating method according to claim 4, wherein as a welding target position for the first layer, a target height y with respect to a origin height x at a base of the trapezoid is determined by a linear expression $y = x + b0$; and as a welding target position for the second and subsequent layers, a target height y with respect to an existing weld height x is determined by a linear expression $y = x + b1$.

8. The welding condition generating method according to claim 4, wherein the condition B includes a weaving width as a parameter; and the weaving width is obtained by adding or subtracting a predetermined offset to or from the base length of the trapezoid.

9. The welding condition generating method according to claim 8, wherein the weaving width is determined by the following equation:

$$\text{weaving width} = (\text{base length} + \text{offset} + \text{lap length} \times (\text{number of passes} - 1))/\text{number of passes}.$$

10. The welding condition generating method according to claim 8, wherein the parameters included in the condition A and the condition B are determined or updated by learning from past welding records.

* * * * *